United States Patent
Kleinhoffer et al.

(10) Patent No.: US 7,021,658 B2
(45) Date of Patent: Apr. 4, 2006

(54) ADJUSTABLE THREE-PIECE HYDROFORMED SPORT BAR

(75) Inventors: Richard Kleinhoffer, Macomb Township, MI (US); Laura M. Bibik, Sterling Heights, MI (US); Raymond J. Vanassche, Shelby Township, MI (US); David P. Zecchin, Metamora, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 159 days.

(21) Appl. No.: 10/310,505

(22) Filed: Dec. 5, 2002

(65) Prior Publication Data

US 2004/0108701 A1     Jun. 10, 2004

(51) Int. Cl.
    *B60R 21/13*     (2006.01)
(52) U.S. Cl. ....................... 280/756; 296/102
(58) Field of Classification Search ............... 280/756, 280/781, 785
    See application file for complete search history.

(56) References Cited

U.S. PATENT DOCUMENTS

| | | | | |
|---|---|---|---|---|
| 4,158,460 A | * | 6/1979 | White | 280/756 |
| 4,795,188 A | * | 1/1989 | Dueker | 280/756 |
| 4,900,058 A | * | 2/1990 | Hobrecht | 280/756 |
| 5,487,564 A | * | 1/1996 | Fueller et al. | 280/808 |
| 5,622,382 A | * | 4/1997 | Zepnik et al. | 280/756 |
| 5,641,193 A | * | 6/1997 | Zepnik et al. | 296/107.09 |
| 5,730,304 A | * | 3/1998 | Duncan | 212/180 |
| 5,848,715 A | * | 12/1998 | Duncan | 212/180 |
| 5,890,738 A | * | 4/1999 | Heiner et al. | 280/756 |
| 6,032,980 A | * | 3/2000 | Rapp et al. | 280/756 |
| 6,142,253 A | * | 11/2000 | Mueller et al. | 180/219 |
| 6,315,326 B1 | * | 11/2001 | Muller et al. | 280/756 |
| 6,471,280 B1 | * | 10/2002 | Fowler | 296/100.04 |
| 6,764,124 B1 | * | 7/2004 | Tohda et al. | 296/96.12 |

* cited by examiner

*Primary Examiner*—Paul N. Dickson
*Assistant Examiner*—Toan To
(74) *Attorney, Agent, or Firm*—Ralph E. Smith

(57) ABSTRACT

An adjustable hydroformed sport bar including left and right outer bar elements and an inner bar element having a smaller diameter than the outer tbar elements. The inner bar element is able to slide inside the outer bar elements where it is adjustably fastened to each of the outer bar elements allowing the outer bar elements to be adjusted laterally with respect to the inner bar element with a bottom gap remaining between the inner bar element and the bottom of the outer bar elements. The left and right outer bar elements include expanded anchor sections to provide for greater yield strength for seat belt support.

4 Claims, 3 Drawing Sheets

ADJUSTABLE THREE-PIECE HYDROFORMED SPORT BAR

FIELD OF THE INVENTION

The present invention relates generally to sport bars used in vehicles. More particularly, the present invention relates to an adjustable three-piece hydroformed sport bar and a method for forming the same.

BACKGROUND INFORMATION

Sport bars are a structural body component typically used in convertible vehicles, but also in certain non-convertible vehicles as well. The sport bar spans the width of the vehicle in a convex arc toward the rear of the top roof portion. The sport bar acts as an anchor point for seat belts as well as other features including e.g., lighting fixtures, trim cladding etc.

Because of its important safety function in supporting the seat belts, legal automotive standards in certain jurisdictions may require that the sport bar be able to support a threshold level of force load so that it does not fail if the seat belt is subject to large tension during, for example, an abrupt movement or an accident. This consideration favors a robust structure for the sport bar. Automotive head impact safety criteria in certain jurisdictions mandate that the sport bar be soft enough to avoid serious injury if a passenger were to strike his or her head directly against the sport bar at a high velocity during such an accident. This consideration weighs in the opposite direction, favoring a less robust construction.

Conventional single piece sport bars generally favor one design criteria over the other, in that they are either too robust for the head impact criteria, or not robust enough for the seat belt load requirements.

It is therefore an object of the present invention to provide a sport bar that provides both adequate seat belt load support and flexibility during possible head impact. It is another object of the present invention to provide a sport bar having an adjustable width.

SUMMARY

The above and other beneficial objects of the present invention are most effectively attained by providing an adjustable sport bar and a method for forming an adjustable sport bar as described and claimed herein. In one example embodiment, the adjustable sport bar is formed from three pieces including left and right outer bar elements and an inner bar element. The inner bar element may have a smaller diameter than the outer tubular bar element or vice versa. The inner tubular bar element is able to slide inside the outer tubular bar elements where it is adjustably fastened to each of the outer tubular bar elements with a bottom gap between the bottom of the inner tubular bar element and the bottom of the outer tubular bar elements. The outer bar elements can be adjusted laterally with respect to the inner bar element. The left and right outer tubular bar elements may include expanded anchor sections to provide for greater yield strength at these sections for seat belt support.

DETAILED DESCRIPTION

Figure 1:
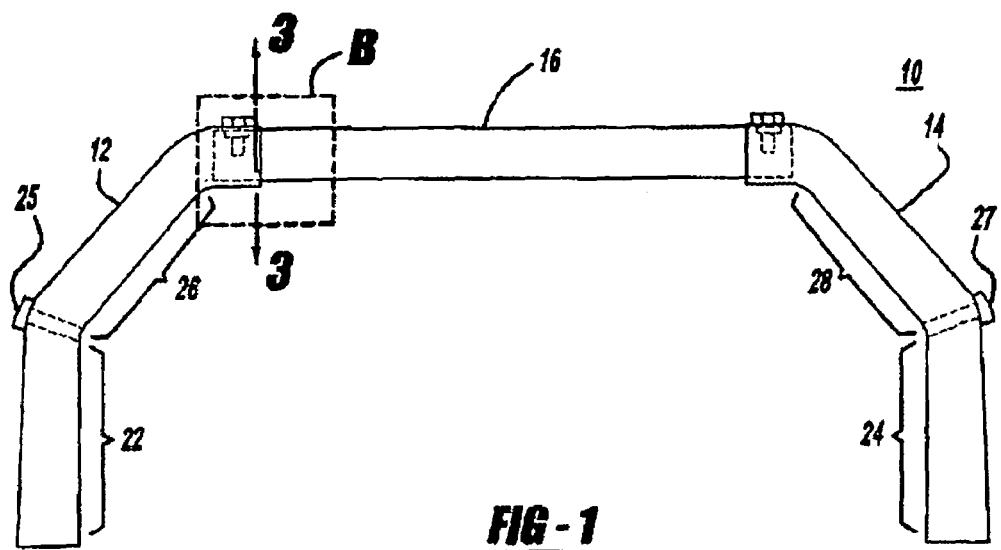
FIG. 1 is a horizontal view of a three-piece sport bar according to an example embodiment of the present invention.

Those skilled in the art will gain an appreciation of the present invention from a reading of the following description when viewed in conjunction with the accompanying drawings of FIGS. 1 to 5D, inclusive. The individual reference characters designate the same or similar elements throughout the several views.

Referring now to FIG. 1, there is shown a horizontal view of an example embodiment of a three-piece sport bar 10 according to the present invention (hereafter referred to as "sport bar"). Sport bar 10 includes left and right outer bar elements 12,14 which may be tubular, and which may be composed of metallic material and formed into appropriate shape and size according to hydroforming techniques whereby sections may be formed into shape from a single tubular member. Each outer bar element 12, 14 includes an expanded anchor section 22, 24 towards the bottom having, e.g., an approximately 20 percent larger tubular width (and 44% larger cross-sectional area) than upper respective left and right non-expanded sections 26, 28. The expanded cross-area gives the anchor sections 22, 24 greater structural tensile strength in comparison to the upper sections 26, 28.

Seat belt anchors 25, 27 attached to the left and right anchor sections 22, 24 include threaded sleeves for receiving a seat belt bolt. Thus, when a high degree of tension is applied to a seat belt, the load is transferred to the seat belt anchors 25, 27 and borne at the expanded anchor sections 22, 24, which have been expanded to improve their respective load-bearing capacities.

Figure 2:
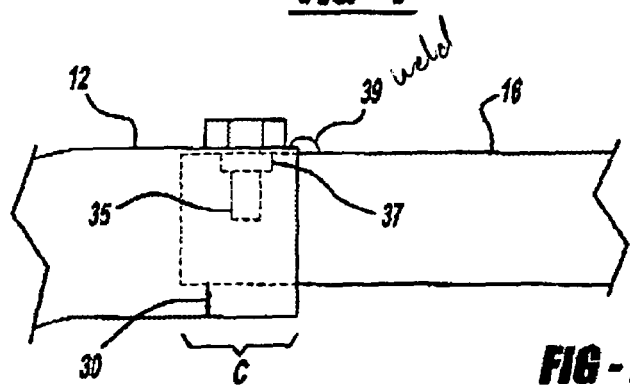
FIG. 2 is an expanded view of area B illustrated in FIG. 1.

Each upper section 26, 28 curves inwardly until their respective upper ends face in a horizontal direction toward each other. FIG. 2 illustrates an expanded view of area B in FIG. 1 where the left outer bar element 12 is coupled to the inner bar tubular element 16. It is to be understood that the illustrations of FIG. 2 apply equally to the coupling between the inner bar element 16 and the right outer bar element 14.

Figure 4:
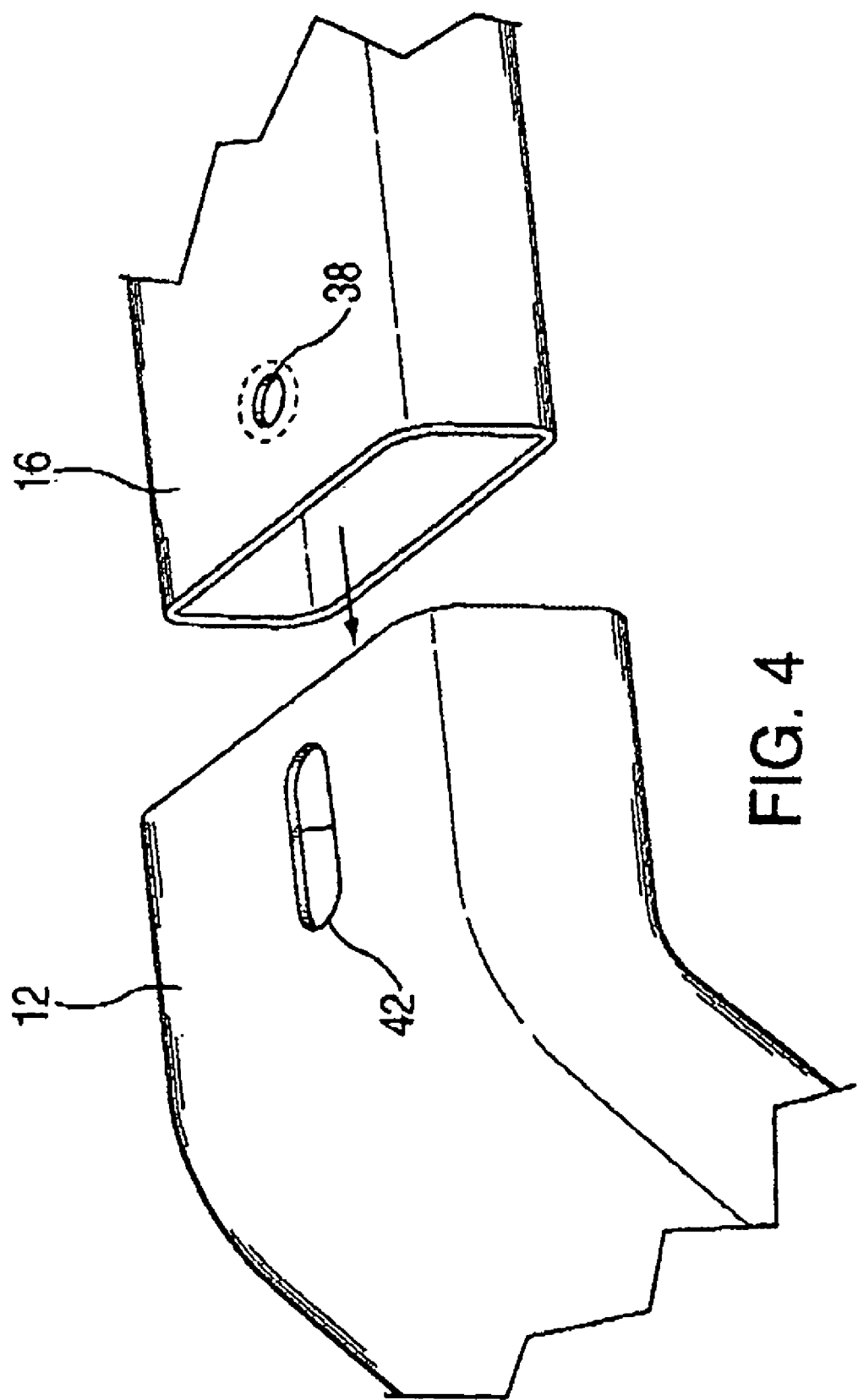
FIG. 4 is a perspective view of the right end of an outer bar element and the left end of an inner bar element according to an example embodiment of the present invention.

As shown in FIG. 2, the inner bar element 16 has a smaller cross-sectional area than the upper section 26 of the outer bar element 12, and therefore the inner bar element may slide into the end of the outer bar element. FIG. 4 shows a perspective view of the right end of outer bar element 12 and the left end of inner bar element 16. As shown, the top of the inner bar element 16 is provided with a hole 38. In addition, the top of the outer bar element 12 includes a narrow lateral adjustment slot 42. As the end of the inner bar element 16 penetrates into the ends of the outer bar element 12, the hole 38 at the top of the inner bar element aligns with the lateral adjustment slot 42 at the top of the outer bar element 12. A bolt 35 may be received through both the hole 38 and the slot 42 and then fastened with a stationary nut 37, such as a rivet nut, to affix the top of the inner bar element to the tops of the outer bar elements 12 (the same features are included on the right outer bar element 14 and the right side of the inner bar element 16). The location of the fastening may be adjusted longitudinally along the slot 42 to account for different body build variations. Since vehicle body dimensions will vary to some extent due to variability in the installation and assembly process, it is important to be able to adjust the width of the sport bar to accurately fit into a particular vehicle body. Thus, according to the present invention, the outer bar elements 12, 14 may be moved rightward and leftward with respect to the inner element 16 to expand or contract the entire width of the sport bar to fit precisely into a particular vehicle. After an appropriate adjustment has been made, and the outer bar 12 element has been fastened to the inner bar 12 element with the bolt 35 and nut 37 coupling, a weld 39, e.g., a structural MIG weld may be applied at the interface between the outer bar element 12 and the inner bar element 16 to permanently adjoin the elements in an integrated structure.

Figure 3:
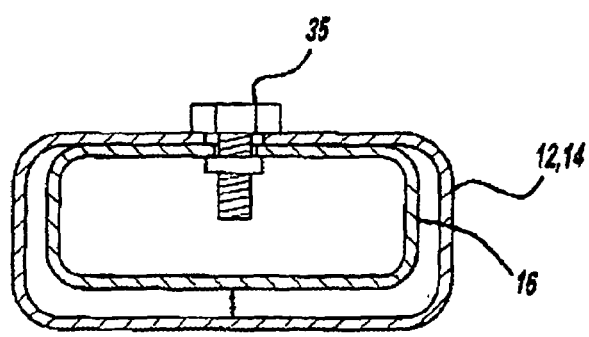
FIG. 3 is a cross-sectional side view taken along line 3—3 in FIG. 1.

Since the inner 16 and outer bar elements 12, 14 are coupled at their respective top portions, there is a bottom gap 30 between the bottom of the outer bar elements 12, 14 and the inner bar element 16 in coupling region C where the inner bar element 16 penetrates the outer bar element 12. The bottom gap 30 is also illustrated in FIG. 3 which shows a cross-section taken along line A—A of FIG. 1 that illustrates the inner bar element 16 within the left outer bar element 14 with the bottom clearance gap 30.

The length of the inner bar element 16 is designed so that the region of coupling C (of FIG. 2) is situated in the vehicle directly over where a passengers head would normally be positioned in a driving situation. Region C is therefore the most likely area a head impact is likely to occur. The upper sections of the outer bar elements in this area 26, 28, having relatively smaller cross-section relative to more robust bottom sections 22, 24, have correspondingly reduced structural compressive strengths and thus absorb impact energy and deflect to some extent under compressive forces, softening any head impacts that might occur in this area. The gap 30 between the outer 12, 14 and inner 16 bar elements provides space to allow the outer bar elements to deflect inwardly against the inner bar element during impact to reduce the intensity of head impacts, without having the resulting deformation to the outer bar elements affect their attachment to the inner bar element. The structural integrity of the sport bar may thus be safeguarded despite any damage to the outer bar elements that might occur during impacts.

Figure 5A:
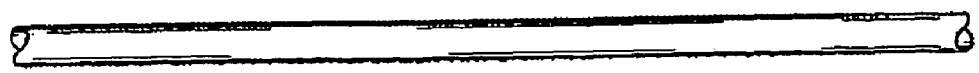
FIGS. 5A to 5D illustrate a production sequence for forming the three-piece sport bar illustrated in FIGS. 1 to 4.
Figure 5B:
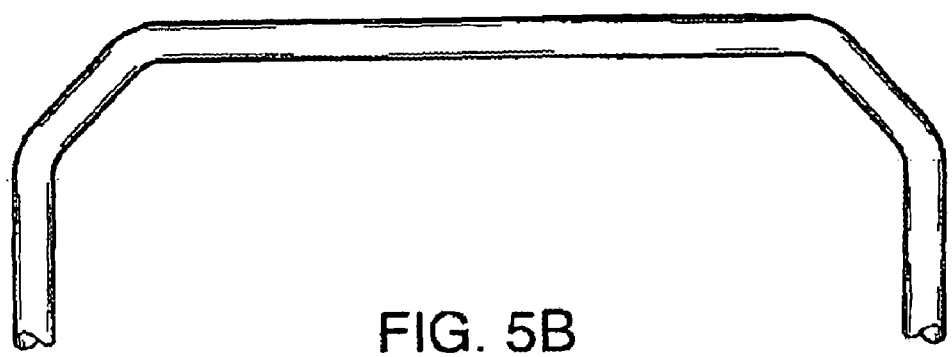
Figure 5C:
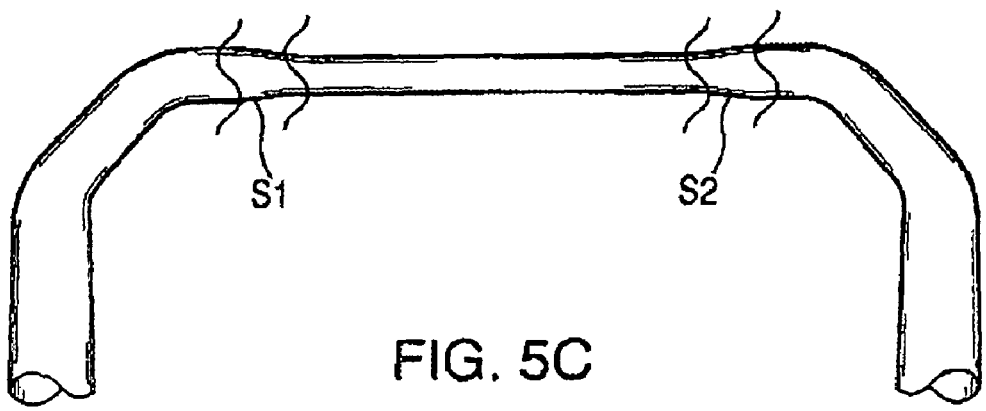
Figure 5D:
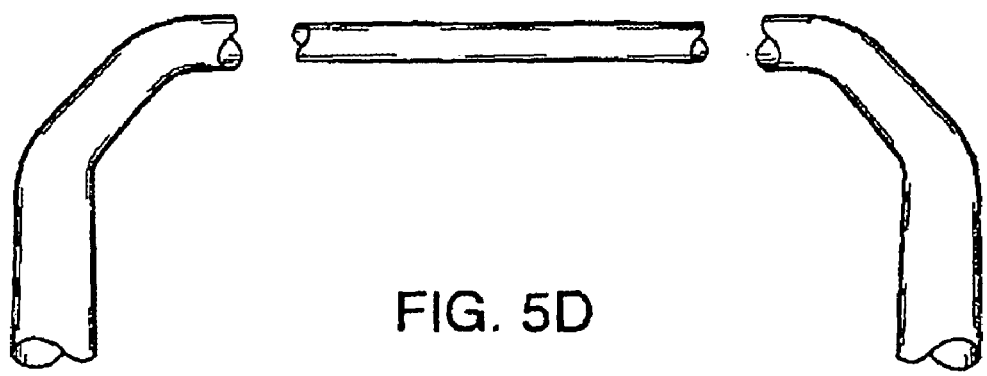

FIGS. 5A to 5D illustrate a production sequence for producing the three bar elements 12, 14, 16 from a single starter tube. FIG. 5A illustrates the starter tube having a uniform diameter and cross-section. FIG. 5B illustrates the shape of the tube after it has been bent into an arcuate shape using a tube bender. The bent tube is then placed into a hydroform die in which water is introduced into the interior of the tube at high pressure, expanding portions of the tube according to the shape of the die. As shown in FIG. 5C, during the hydroforming, the diameters of the outer bottom sections of the tube are expanded, and the diameter of the middle section is unchanged, with transitional sections S1 and S2 showing a gradual expansion between the middle and outer sections. The transitional sections are then cut out and removed from the tube, dividing the tube into the three bar elements 12, 14, 16.

While the inner bar element 16 has been described above as having a smaller outer diameter than the inner diameter of the outer bar elements 12, 14 is should be appreciated that the outer diameter of the outer bar elements 12, 14 may be smaller than the inner diameter of the inner bar element 16 so that the ends of the outer bar elements 12, 14 are insertable into the ends of the inner bar element. Alternatively, the outer diameter of one of the outer bar elements 12, 14 may be smaller than the inner diameter of the inner bar element 16 and the inner diameter of the other one of the outer bar elements 12, 14 may be greater than the outer diameter of the inner bar element 16, so that one end of the inner bar element 16 is inserted into one of the outer bar elements 12, 14 and the other end of the inner bar element 16 receives the other one of the outer bar elements 12, 14.

Thus, the several aforementioned objects and advantages of the present invention are most effectively attained. Those skilled in the art will appreciated that many modifications of the preferred embodiments described hereinabove may be made without departing from the spirit and scope of the invention. Although several preferred embodiments of the invention have been described and disclosed in detail herein, it should be understood that this invention is in no sense limited thereby and that its scope is to be determined by that of the appended claims.

What is claimed is:

1. An adjustable sport bar comprising:
   a left outer bar element having an upper end and a lower end, the lower end having a greater yield strength than the upper end;
   a right outer bar element having an upper end and a lower end, the lower end having a greater yield strength than the upper end; and
   an inner tubular bar element having a left end adjustably fixed to the upper end of the left bar element and a right end adjustably fixed to the upper end of the right bar element; wherein the inner bar element is fastened to a top of the upper ends of the left and right outer bar elements, leaving a gap between the inner bar element and a bottom of the left and right outer bar elements and wherein the inner bar element and the outer bar elements are tubular, and a first tubular width of the lower ends of the left and right outer bar elements is approximately twenty percent larger than a second tubular width of the inner bar element.

2. The adjustable bar element of claim 1, wherein the left and right outer bar elements each include lateral adjustment slots at their respective upper ends, and the inner bar element includes left and right holes that can be adjustably aligned with the longitudinal slots of the left and right outer bar elements to receive a bolt.

3. The adjustable bar element of claim 1, wherein the sport bar further includes a left structural weld positioned at a junction between the inner bar element and the upper end of the left outer bar element, and a right structural weld positioned at a junction between the inner bar element and the upper end of the right outer bar element, the left and right structural welds being positioned after the sport bar has been adjusted to accommodate a specific body build variation.

4. An adjustable sport bar having, a width comprising:
a left outer bar element having an unper end and a lower end, the lower end having a greater yield strength than the upper end:
a right outer bar element having an upper end and a lower end, the lower end having a greater yield strength than upper end;
an inner tubular bar element having a left end adjustably fixed to the upper end of the left bar element and a right end adiustably fixed to the upper end of the right bar element thereby allowing the left and right outer bar elements to be adjusted laterally with respect to the inner bar element so as to vary the width of the sport bar; and wherein the inner bar element and the left and right outer bar elements are tubular, and a first tubular width of the lower ends of the left and right outer bar elements is approximately twenty percent larger than a second tubular width of upper ends of the left and right outer bar elements.

* * * * *